July 17, 1962 J. A. HARDMAN 3,044,318
DRIVE MECHANISM FOR TRACK LAYING VEHICLES
Filed Dec. 31, 1958 5 Sheets-Sheet 1
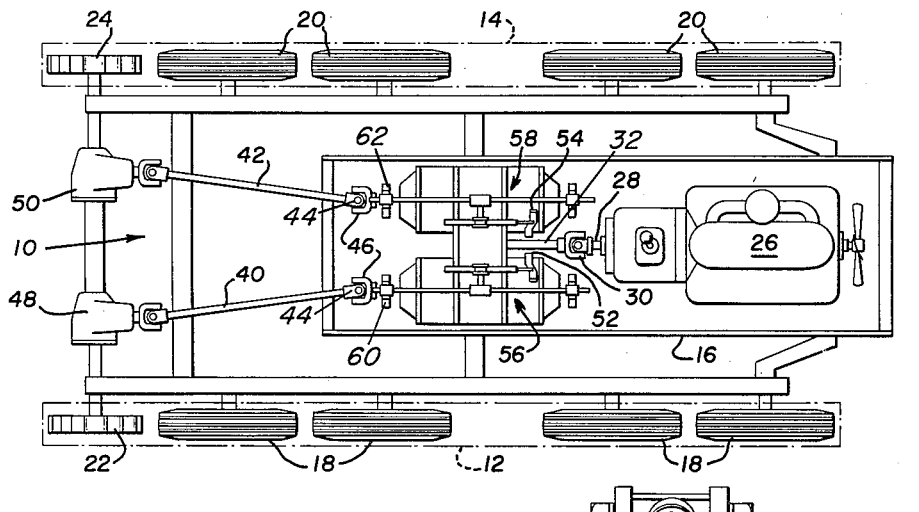
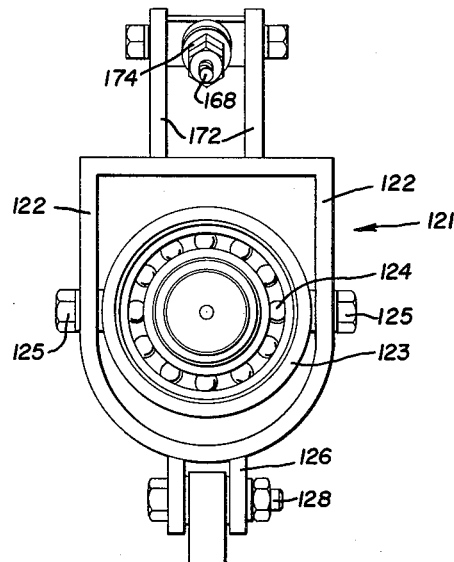
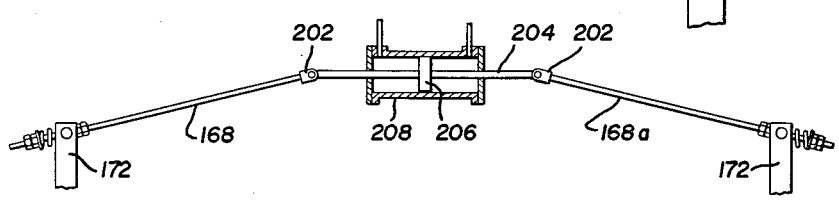
INVENTOR.
JAMES A. HARDMAN
BY
ATTORNEYS

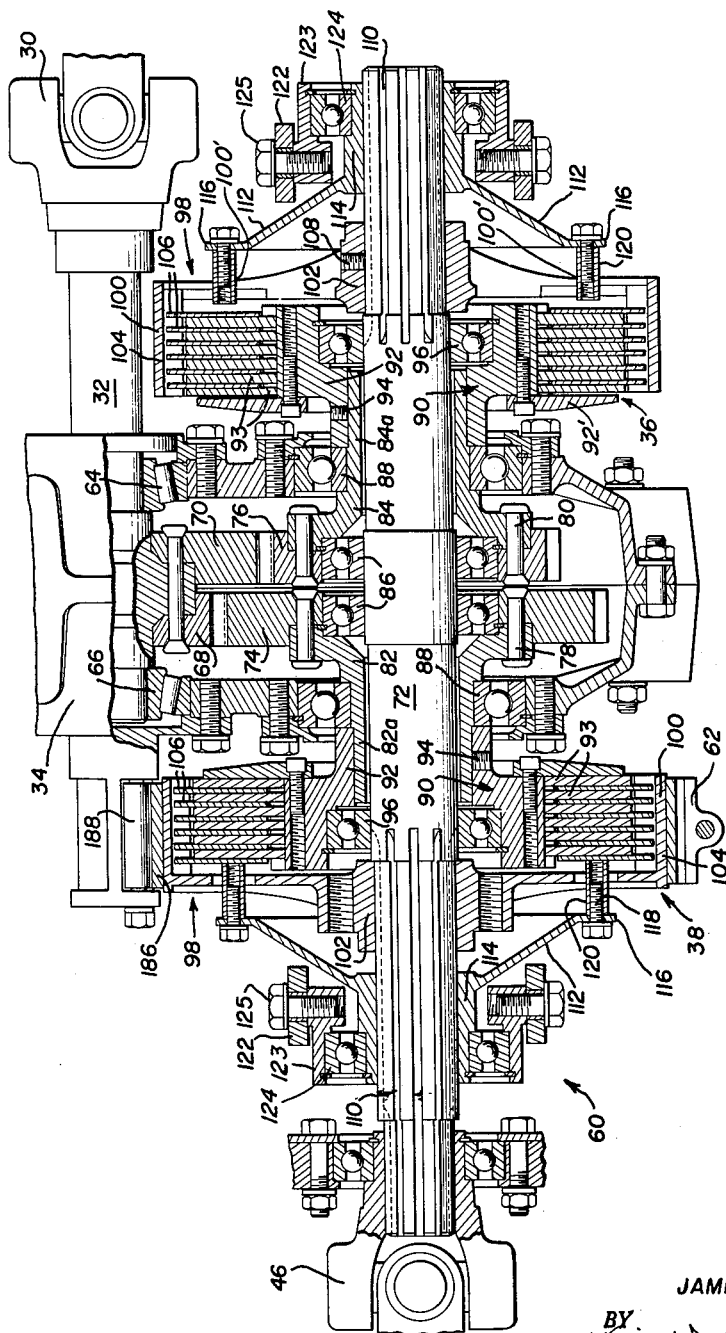

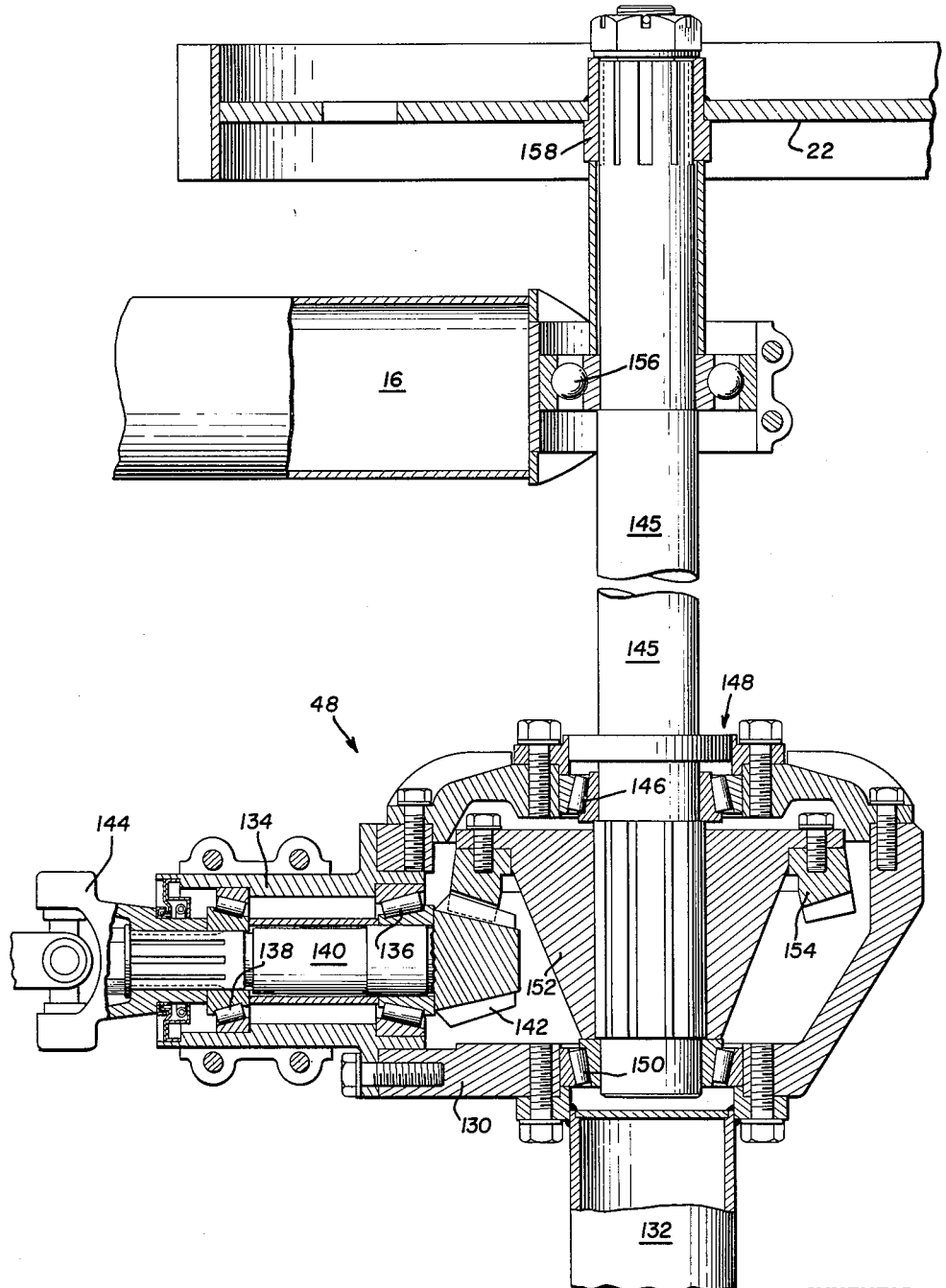

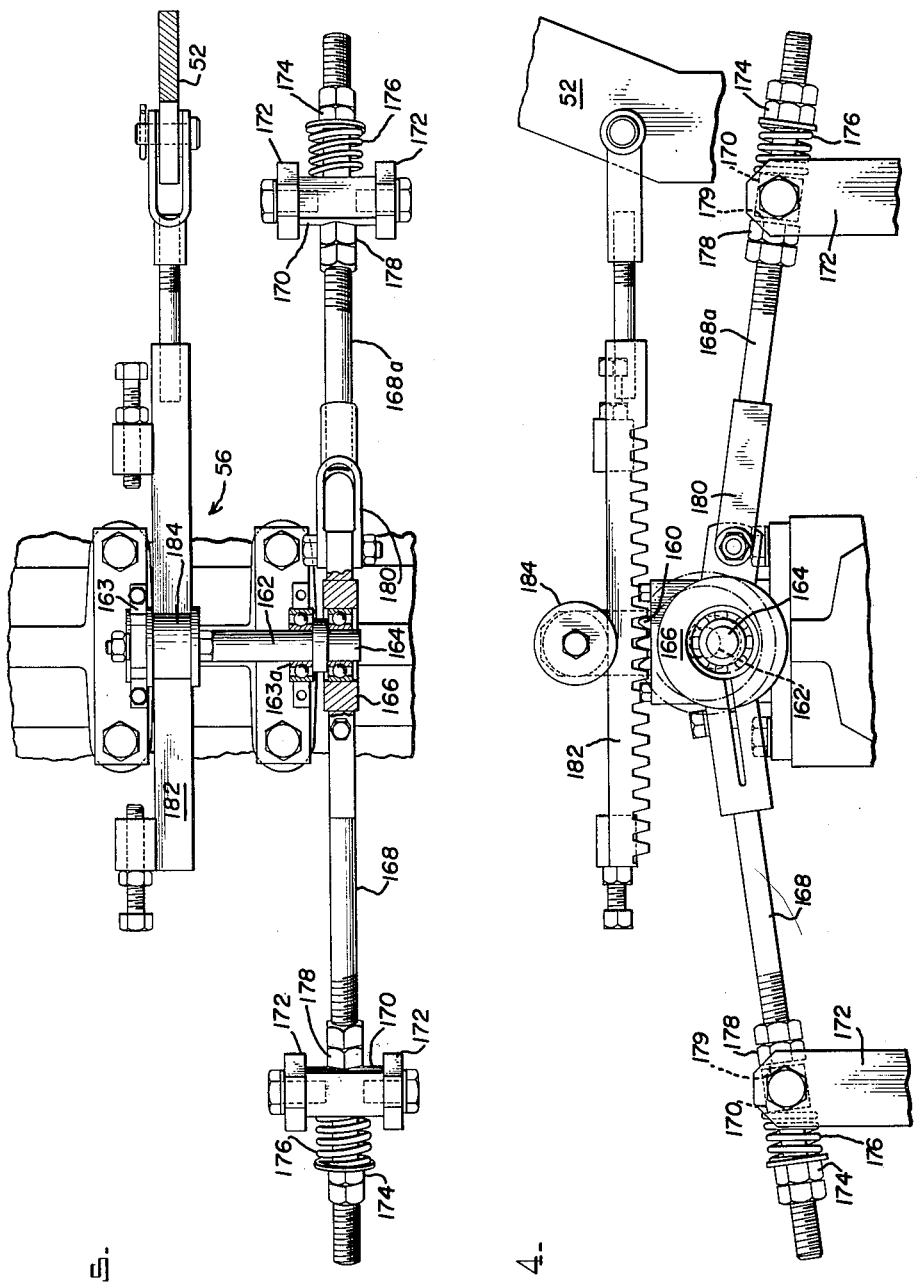

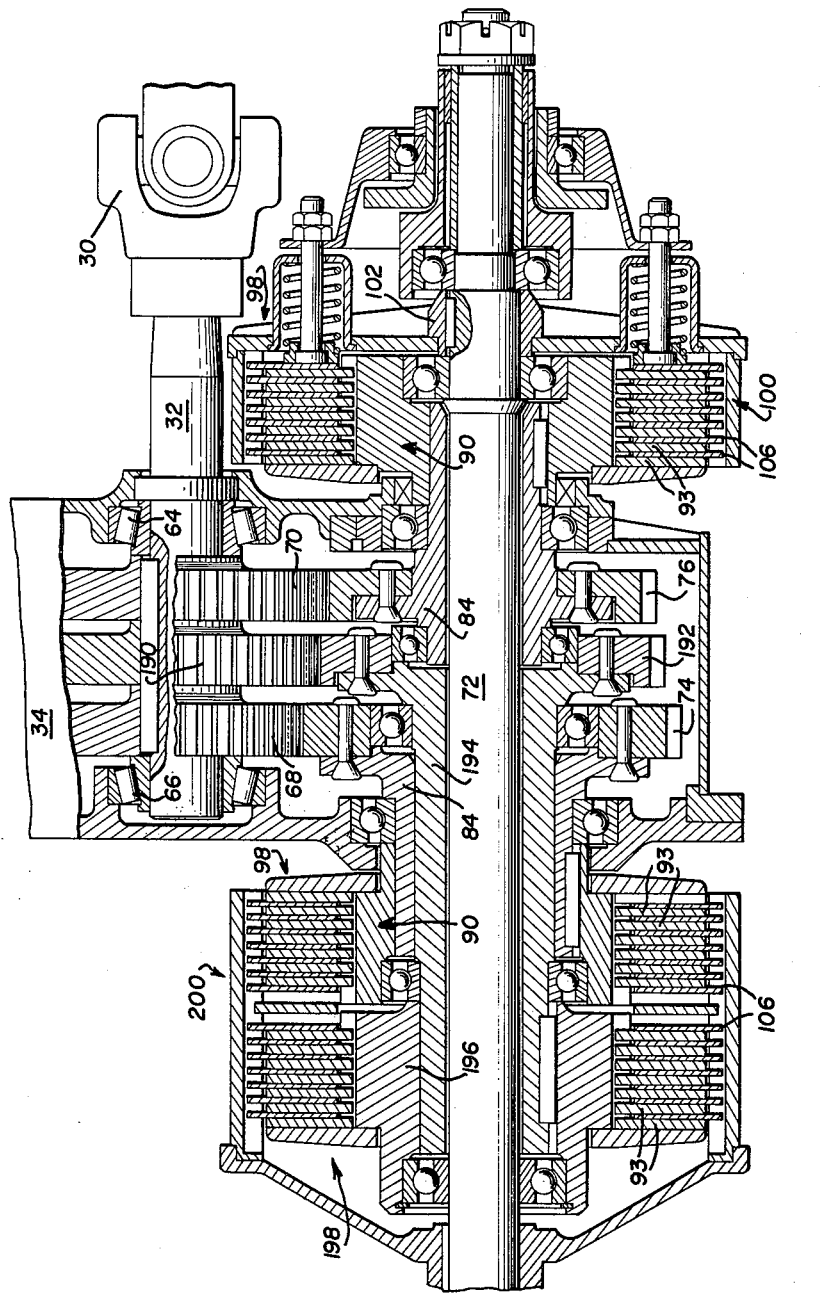

United States Patent Office 3,044,318
Patented July 17, 1962

3,044,318
DRIVE MECHANISM FOR TRACK LAYING VEHICLES
James A. Hardman, Logan, Utah, assignor to Utah Scientific Research Foundation, Logan, Utah, a corporation of Utah
Filed Dec. 31, 1958, Ser. No. 784,240
6 Claims. (Cl. 74—665)

This invention relates to vehicle drive mechanisms and more particularly and specifically to a speed change drive mechanism for the tracks of a track laying vehicle.

Track laying vehicles heretofore known and used have incorporated various drive and transmission mechanisms intended to accomplish improved vehicle function in both power efficiency and maneuverability. However, these prior devices have not produced optimum vehicle function as desired by reason of functional limitations inherent in prior power unit constructions.

It is a general object of the present invention to provide a novel and useful drive mechanism for vehicles having a single input and plural output shafts wherein each output shaft is independently controllable through the full power range from idle to full power.

It is a more general object of this invention to provide a drive mechanism transmitting independently selected speeds from a single input to plural outputs.

It is a primary object of this invention to provide a drive mechanism for plural tracks of a track laying vehicle which serves to intergear the two track outputs so that power flow from a single input shaft will be automatically selected and delivered to that track of the two tracks having the greatest torque demand.

Another object of this invention is the provision of a drive mechanism for the plural tracks of a track laying vehicle which incorporates two or more independent speed ratios as take-offs to each of plural tracks from a single input shaft.

A further object of this invention lies in the provision of a drive mechanism of the character described wherein power trains are provided enabling the flow of power from one track to the other track to automatically compensate for varying and different track speeds during turning and resulting from fluctuating torques produced independently in the two tracks by irregular terrain.

Still another object of this invention is to provide a drive mechanism as described wherein all gears in said mechanism remain in constant engagement at all times thereby relieving strain and reducing damage normally incident to shifting of gears into and out of mesh, and eliminating control means normally required for shifting of plural gears.

Still a further object of the present invention is the provision of a drive mechanism for transmitting independently selected speeds and power to several output shafts from a single input shaft by the structure of which any one of the output shafts may be converted to a driver or driving shaft acting back through the input shaft to power another output shaft, said conversion being automatically accomplished during certain speed change reductions in the convertible shaft.

Yet another object of this invention is the provision of a drive mechanism construction adaptable to planetary gear, chain and sprocket, and belt trains.

Another object of this invention is the provision of a vehicle drive mechanism which eliminates the need for a frame anchor and, thus, avoids the power losses incident to frame anchors.

A still further object and advantage of this invention is the provision of a simple, easily manipulated control mechanism for a track laying vehicle which permits selective pressure application to multiple clutches enabling control of slippage and facilitating smoother manipulation of such a vehicle which is steered entirely through differential power application to tracks on opposite sides of the vehicle.

Another object of this invention is the provision of a simple, inexpensive and durable drive mechanism for track laying vehicles which incorporates a minimum of parts and components which are so assembled as to reduce weight and bulk and which facilitate maintenance, upkeep and repair, and a construction having a maximum of duplicated, interchangeable parts.

Still further objects and advantages of the present invention will become more readily apparent to those skilled in the art when the following descriptions are read in the light of the accompanying drawings, in which:

FIG. 1 is a top plan view of a vehicle frame illustrating supporting endless tracks, drive mechanism and power plant in accordance with the present inventive concepts.

FIG. 2 is a horizontal sectional view in top plan of the drive mechanism constituting the principal embodiment of the present invention.

FIG. 3 is a horizontal sectional view of one rear track drive assembly contemplated by the present invention.

FIG. 4 is an enlarged front elevation of a clutch control assembly.

FIG. 5 is a top plan view of the assembly of FIG. 4.

FIG. 6 is an enlarged elevational view of the clutch control yoke and related components.

FIG. 7 is a fragmentary sectional view similar to FIG. 2 showing a modified form of the drive mechanism assembly.

FIG. 8 is a diagrammatic view of a modified form of the clutch control mechanism.

*Structure*

By reference to the accompanying drawings, and particularly FIG. 1 thereof, it is seen that the broad concepts of the present invention relate to a drive mechanism, generally designated at 10 for the two endless tracks 12 and 14 of a track laying vehicle (frame) 16.

The vehicle consists principally of a rigid tubular frame 16 rotatably supporting an assembly of idler wheels 18 and 20 longitudinally of each side thereof, driving wheels 22 and 24 aligned one to the rear of each side assembly of idlers, and endless tracks 12 and 14 trained in engagement one about each side assembly of idlers and associated driving wheel.

A conventional power plant 26 is mounted within the forward end of the vehicle frame 16 to provide a rearwardly projecting crank shaft 28. The crank shaft 28 is coupled, as at 30, to the forward extremity of the drive or input shaft 32 of the drive mechanism 10.

The drive mechanism 10 (see FIGURES 1 and 2) consists of a central gear box or case 34 extending transversely of the frame 16, and front and rear clutch assemblies 36 and 38 respectively on each side of the gear box 34. Rearwardly extending driven shafts 40 and 42 are coupled as at 44 to the rearwardly projecting extremities 46 of the output shafts of the drive mechanism rearwardly of the rearward clutch assemblies 38. The extended driven shafts 40 and 42 are operably connected into the track drive assemblies 48 and 50 which are associated one with each of the rear driving wheels 22 and 24 of the tracks 12 and 14 respectively.

Associated with the front and rear clutch assemblies 36 and 38 on each side of the drive mechansim are clutch control levers 52 and 54 and their associated control linkage assemblies 56 and 58.

To generally complete the structure of the drive mechanism, brake units, generally designated 60 and 62, are provided one for each of the output shafts of the drive mechanism. The brake units are each associated with the rearward clutch assembly 38 on each side of the drive mechanism and are interconnected with the clutch control units for correlated operation therewith as will hereinafter appear.

By way of more specific disclosure and with initial reference to FIG. 2 of the drawings, the input shaft 32 extends transversely through the gear box 34 centrally thereof and longitudinally with respect to the vehicle frame. The input shaft 32 is journalled at each end in bearings 64 and 66 supported in the walls of the gear box 34. The input shaft mounts, intermediate the bearings 64 and 66, two gears 68 and 70 of distinctively different diameters, gear 70 being of the greater diameter in the instant illustration. The gears 68 and 70 are spaced apart on the input shaft equidistant on either side of the longitudinal centerline of the gear box 34 in a direction transversely of the frame.

Spaced equidistant to each side of and in parallel with the input shaft 32 are the two driven or output shafts of the drive mechanism. Because the two output sides of the drive mechanism are identical only one side has been shown in detail in the drawings (e.g. see FIGURE 2), and the descriptions to follow will be confined to the single side shown in recognition of such duplication.

The output shaft shown, 72, supports intermediate its length a pair of gears 74 and 76 which, like gears 68 and 70 on the input shaft, are of different diameters. The gear 74 is the larger in diameter of this pair and is positioned to maintain meshed engagement with gear 68 on the input shaft. The smaller gear 76 on the output shaft is positioned in meshed engagement with gear 70 on the input shaft 32.

Each of the gears 74 and 76 is fixed, as at 78 and 80, to a tubular hub 82 and 84 respectively, each of which has integrally formed extended sleeve portion 82a and 84a respectively which project in opposite directions along the output shaft 72. Each of the hubs carries a roller bearing or the like 86 about the inner face thereof in bearing engagement with the shaft 72.

A second roller bearing assembly 88 or the like is carried by each wall of the gear box to engage the outer face of each of the extended sleeves of the hubs 82 and 84 where these sleeves project outwardly through the walls of the gear box front and rear thereof. The front and rear clutch assemblies 36 and 38 are located concentrically about the extended ends of the output shaft 72 and about a portion of each of the gear hub sleeves 82a and 84a where they project outside the gear box walls.

The front and rear clutch assemblies, as generally designated 36 and 38, each consists of an internal drive member 90 taking the form of a tubular hub 92 having a fixed, clutch disc reaction member 92' and longitudinally spaced radially extending drive discs 93 about the circumference thereof and carried thereon by longitudinally splined engagement therewith. A portion of each hub 92 longitudinally thereof, is splined onto the extended end of the sleeve 84a associated with gear 76, or 82a associated with gear 14, and is secured thereto by set screw 94 or the like to form the sleeve and hub clutch as a unit. The remaining longitudinal portion of each hub 92 is annularly recessed to receive a roller bearing assembly 96 or the like therewithin in engagement with the output shaft 72 beyond the outermost end of the gear hub sleeve 84a or 82a as the case may be.

Associated with the clutch drive member 90 of each clutch assembly is the driven drum of the clutch generally designated at 98, which includes a cup-shaped housing 100 having an axial central boss 102, splined on the output shaft 72 to position the cup concentrically about the drive member 90 from the outer portion of the shaft, and bottom wall, finger admittance apertures 100' which are in registry with fingers or sleeves 120. The circular side wall 104 of the housing 100 is of a diameter greater than that of the radially extending drive discs 93 of the drive member 90 and carries in spaced, splined relationship therealong inwardly, radially projecting driven clutch discs 106 which normally lie spaced from and intermediate the adjacent pairs of drive discs 93. The boss 103 is keyed by set screws 108 or the like into longitudinal splines 110 formed in the shaft 72 inwardly from the adjacent end thereof.

An outer cone 112 having a central hub 114 is positioned with the hub slidably splined on the extended end of shaft 72 and the peripheral cone lip 116 carries radially spaced bolts 118 engaging and supporting sleeves 120 arranged radially of the outwardly disposed face of the bottom wall of the cup member 110 and extended therethrough, through apertures 100', in opposition to the discs of the clutch and movable against the disc pack axially inward.

As is best seen in FIG. 6, a yoke member 121 is positioned with the bifurcated arms 122 thereof disposed vertically adjacent each side of the boss 114 of the clutch cone 112. The yoke arms 122 are pivotally connected to the ring support 123 of a circular roller bearing assembly 124 on horizontal pins 125 which is engaged or journalled about the outer circumference of the cone boss 114 and which is affixed thereto in such a manner as to provide fixed longitudinal engagement between the bearing assembly and boss in both directions axially of shaft 72. The stem 126 of the yoke member depends below the cone boss 114 and is supported from a gear case flange on a horizontal pivot pin 128 disposed perpendicularly to the axis of output shaft 72. The clutch control mechanism to be hereinafter described is associated with yoke 121 as will be seen.

Each output shaft of the drive mechanism is provided on the rearward end of the frame with a track drive assembly, heretofore generally designated 48 or 50, to which the output shafts are connected through coupling 46 and extended driven shaft sections 40 and 42. As seen in FIG. 3 of the drawings, each track drive assembly consists of a housing 130 which is supported on that face or wall thereof disposed inwardly of the frame on a fixed tubular spacer shaft or strut 132 which serves to rigidly interconnect the opposed inwardly faces of the two track drive assemblies transversely of the frame.

The forwardly disposed face of the track drive assembly housing 130 supports a tubular entry sleeve 134 carrying in axially spaced relationship therein two circular bearings 136 and 138 which journal a pinion 140 which in turn carries a conical pinion gear 142 on the inner end thereof within the housing 130. The extended end of the pinion 140 carries a universal drive coupling 144 which serves to couple the pinion to the extended driven shaft 44, or 46, as the case may be.

A driving axle 145 enters that face of the housing opposite the spacer strut 132 and perpendicular to the axis of the pinion 140 which axle is journalled in a bearing 146 in the face of the housing wall and is sealed as at 148 exteriorly of the bearing. The axle 145 extends across the housing where the innermost end is journalled in a ring bearing 150 in the opposite wall of the housing.

The axle 145 carries within housing 130 a conical hub 152 secured thereon and supporting a ring gear 154 in meshed engagement with pinion gear 142. The extended end of axle 145 is journalled in a bearing 156 carried by the vehicle frame and is keyed or splined, beyond said bearing, into the hub 158 of the spider or sprocket track drive wheel 22, or 24 as the case may be.

The clutch control mechanisms, earlier identified generally at 56 and 58 which are identical for each front and rear pair of clutches on each side of the drive mechanism, each consists, as best seen in FIGS. 4 and 5, of spur gear 160 fixed on a shaft 162 having a horizontal axis above and transversely of the gear box 34 and which is journalled in spaced bearings 163 and 163a. The shaft 162 in a direction outwardly of the vehicle frame carries an eccentric 164 rotatable therewith and about which is secured a connecting rod bearing 166. The connecting rod bearing carries an extended rod 168 which extends slidably through a block 170 pivotally supported between vertical posts 172 which are integral vertical extensions of the yoke 121 of the clutch assembly on the same side of the gear box with said control or connecting rod. The extended end of the connecting rod 168 beyond the block 170 is provided with a nut 174 threaded thereon and retaining a coil spring 176 under compression between the block 170 and the nut 174. The connecting rod is also provided with a stop nut 178 in preselected, closely spaced relationship with the inner face of the block 170 in opposition to the inner end of spring 176.

A second connecting or clutch control rod 168a is associated with the eccentric 164 having one end thereof pivotally secured, through the medium of a yoke fitting 180, to the connecting rod bearing 166 rotatable on the eccentric. The second end of rod 168a extends, diametrically remote to rod 168, slidably through a second block 170 supported above the clutch cone control yoke of the rear clutch assembly by duplicate structure to that above described relative to rod 168.

Associated with each spur gear 160 on each side of the gear box transversely of the frame is a gear rack 182 engaging the upper peripheral portion of the spur gear and retained in engagement therewith by an overhanging guide bearing 184. The forward ends of each gear rack 182 are pivotally connected to one or the other of the two clutch control levers 52 and 54.

To complete the construction of the preferred embodiment of the present invention hereinbefore described, each output shaft, as 72 illustrated in FIG. 2, is provided with a brake band 186 secured about the outer face of the wall of drum housing 100 of clutch 38 rotating within a brake shoe assembly 188 fixed thereabout on a flanged portion of the gear box 34.

It is fully contemplated, as is disclosed by way of illustrative example in FIG. 7 of the drawings, that three or more speed ratios may be provided for each output shaft of the drive mechanism by the addition of a gear or gears and clutch or clutches on each shaft for additional speed ratios.

In FIG. 7, for example, a third gear 190 is added on input shaft 32 intermediate gears 68 and 70, and a third gear 192 is added on output shaft 72 intermediate gears 74 and 76 and in meshing engagement with additional drive gear 190.

Driven gear 192 is provided with an elongated hub sleeve 194 which extends concentrically between shaft 72 and the telescoping sleeve 84a of hub 84 to project beyond the extremity of the sleeve 84a where it is coupled to the drive member 196 of a third clutch mechanism generally designated 198. This third clutch mechanism 198 is located within a common drum 200 with the drive mechanism of the clutch assembly of gear hub 84 and the drum carries discs so arranged as to selectively move from neutral position into engagement either with the discs of the drive members of gear hub 84 or with the gear hub 198a.

The foregoing arrangement requires a modified clutch lever and linkage assembly having, in addition to neutral, three drive or engagement positions to control selection of engagement of one of the three speed ratios provided by the three-gear-three-clutch mechanism now provided. Still additional speed ratios may be provided within the scope of the concepts hereinbefore disclosed by further multiplication or duplication of speed gears and clutches consistent with the concepts described.

It is additionally contemplated that certain modifications may be made in details within the broad general framework of this invention without departure from the scope or achievements inherent in the preferred embodiments.

For example, and with reference to FIG. 8 of the drawings, it is contemplated that hydraulic control linkage could be used for activation and control of the several clutch assemblies. In this modified control structure the connecting or control rods 168 and 168a (FIGS. 3 and 4) would each have pivotal connection at their adjacent ends, as at 202, to the opposite ends of a piston rod 204 of a double acting ram piston 206 operating, by selective valve control, within a cylinder 208.

Additionally, the several cooperative gears on the input and output shafts of the drive mechanism could be replaced by pulley and shive or chain and sprocket components to accomplish equivalent functions. By further modication additional output shafts could be added to the drive mechanism by triangulation or clustering about the single input shaft with a single input gear controlling each speed take-off for all output shafts.

*Operation*

The operation of the track laying vehicle drive mechanism hereinbefore described is such that at all times when the power plant is operably engaged with the input shaft 32, the drive mechanism will be driven and will rotate with the drive gears thereon in meshed, rotating engagement with the driven years of both output shafts. Operation of the clutch control levers will permit both output shafts to be coupled with the input shaft in like ratios so that the identical power is transmitted to the two endless tracks of the vehicle simultaneously. However, independent operation of the clutch levers is possible whereby different speed ratios may be transmitted to the two tracks at the same time and it is further possible to disengage one track from power input completely while the other track is coupled in either of two speed output ratios with the input shaft. It is further possible to brake an output shaft while in neutral position while the other output shaft is in power engagement with the input shaft.

In effecting a turn of a track laying vehicle embodying the drive mechanism of this invention increased steering power is automatically obtained in the selected turning track by clutching down or clutching out the outside track. As the outside track is slowed the forward momentum of the vehicle overrides the gear take-off speed and converts the output shaft on the outside track to a driver transmitting power back through the driving gears to the opposite output shaft. his reverse power flow is controllable through the application of pressure on the clutch pack of the converted output shaft.

Further, because the drive mechanism disclosed eliminates a frame anchor, and because of the concentric compactness of each clutch assembly about each shaft, eliminating radially spaced points of drive engagement, no power loss is incurred from the drive into the frame or other vehicle components.

Thus, from the foregoing it may be seen that a simple, efficient and versatile drive mechanism has been provided which accomplishes the maximum in power efficiency and maneuverabiltiy of a track laying vehicle. It is evident that apparatus has been provided wherein a single steering handle in the nature of a clutch lever has been provided for each track which provides for full control of each track from neutral, to low, to high speed or power input and wherein the control levers are independently operable to provide differing ratios of speed and power through the full range from neutral to high in each track simultaneously.

It is further seen that an apparatus of the type described has been provided wherin all of the gears are contained within a single case while all controls and operational components are outside of the case and readily accessible for cleaning and repair and, particularly, wherein there is a substantial dupliction of parts throughout the entire assembly reducing cost of production and facilitating standardization and interchangeability.

Accordingly, a drive mechanism for a track laying vehicle accomplishing the new and useful results denoted and satisfying the numerous advantages and objects heretofore set forth has been fully provided.

In the foregoing description, certain terms have been used for brevity, clearness and understanding, but no unnecessary limitations are to be implied therefrom beyond the requirements of the prior art since such words are used for descriptive purposes only and are intended to be broadly construed.

Having now described the invention, the construction, the operation and use of preferred embodiments thereof together with the advantageous new and useful results obtained thereby, what is desired to be claimed is:

1. A speed change drive mechanism including, in combination, a power input shaft, a power output shaft, plural driving members of different speed ratios fixedly mounted upon said power input shaft, plural driven members of similarly different speed ratios journalled upon said power output shaft and freely rotatable thereabout, said driven members being in respective engagement with corresponding ones of said driving members for the different speed ratios; plural clutches each comprising a clutch housing fixedly keyed to said power output shaft for revolvement therewith, at least one driven clutch disc keyed to and within said clutch housing for axial translation with respect thereto, at least one driving clutch disc keyed to a respective one of said driven members for axial translation with respect thereto and proximate with said driven clutch disc, reaction means affixed to a respective one of said driven members for revolvement therewith and disposed in proximity with respect to said clutch discs on one side thereof, and means disposed on the remaining side of said clutch discs for thrustedly engaging said driven clutch disc to compress the clutch discs against said reaction means so as to effect clutch engagement; and clutch control means for selectively advancing a selected one of said thrustedly engaging means toward its respective clutch discs to effect clutch engagement.

2. A speed change drive mechanism according to claim 1 wherein each of said thrustedly engaging means comprises a clutch cone translatably splined upon said power output shaft.

3. Structure according to claim 2 wherein each of said clutch housings includes finger admittance apertures, and wherein each of said clutch cones includes disc pack compression fingers disposed in registration with and advanceable through said housing apertures.

4. A speed change drive mechanism including, in combination, a power input shaft, a power output shaft, plural driving members of different speed ratios fixedly mounted upon said power input shaft, plural driven members of similarly different speed ratios journaled upon said power output shaft and freely rotatable thereabout, said driven members being in respective engagement with corresponding ones of said driving members for the different speed ratios, said plural driven members including axial sleeve extensions, a housing encasing said driving and driven members and journalling said axial sleeve extensions, said axial sleeve extensions protruding outwardly from said housing, said driven shaft being journalled within and protruding from said housing beyond said axial sleeve extensions of said driven members, plural clutches each comprising a clutch housing mounted upon and fixedly keyed to said power output shaft for revolvement therewith, at least one driven clutch disc keyed to and within said clutch housing for axial translation with respect thereto, at least one driving clutch disc proximate with said driven clutch disc and axially translatably keyed to a respective one of said driven members at the axial sleeve extension thereof, reaction means affixed to a respective one of said driven members for revolvement therewith and disposed in proximity with respect to said clutch discs on one side thereof, and means disposed on the remaining side of said clutch discs for thrustedly engaging said driven clutch disc to compress the clutch discs against said reaction means so as to effect clutch engagement; and clutch control means for selectively advancing a selected one of said thrustedly engaging means toward its respective clutch discs to effect clutch engagement.

5. In combination, a driving member, a driven member; clutch means for coupling the motion of said driving member to said driven member and comprising a housing fixedly keyed to said driven member, a driven clutch disc keyed to and within said clutch housing for axial translation with respect thereto, a driving clutch disc keyed to said driving member for axial translation with respect thereto and disposed in proximity with said driven clutch disc, reaction means fixedly disposed with respect to said driving member and on one side of said clutch discs, and means disposed on the remaining side of said discs for thrustedly engaging said driven clutch disc to compress the clutch discs against said reaction member so as to effect clutch engagement.

6. A speed change drive mechanism including, in combination, a power input shaft, plural power output shafts, plural driving members of different speed ratios fixedly mounted on said power input shaft, plural driven members of different speed ratios journalled upon said power output shafts and freely rotatable thereabout, said driven members being in respective engagement with corresponding ones of said driving members for the different speed ratios, said plural driven members including axial sleeve extensions extending in opposite directions, a housing encasing said driving and driven members and journalling said sleeve extensions, said axial sleeve extensions protruding outwardly from said housing, said driven shafts being journalled within and protruding from said housing beyond said axial sleeve extensions of said driven members; plural clutches each comprising a clutch housing fixedly splined upon a respective one of said power output shafts for revolvement therewith, at least one driven clutch disc slideably keyed to its respective clutch housing for axial translation therewithin, at least one driving clutch disc proximate with said driven clutch disc and slideably keyed to a respective one of said driven members at the axial sleeve extension thereof, reaction means affixed to a respective one of said driven members for revolvement therewith and disposed in proximity with respect to said clutch discs on one side thereof, and means disposed on the remaining side of said clutch discs for thrustedly engaging said driven clutch disc to compress the clutch discs against said reaction means so as to effect clutch engagement; and clutch control means for selectively translating selected ones of said thrustedly engaging means toward its respective clutch discs so to engage selectively clutches of selected driven members with a maximum of but one driven member per respective output power shaft being so engaged thereby.

References Cited in the file of this patent

UNITED STATES PATENTS

| | | |
|---|---|---|
| 387,386 | Whitney | Aug. 7, 1888 |
| 1,154,749 | Fee | Sept. 28, 1915 |
| 1,344,366 | Wickersham | June 22, 1920 |
| 1,423,642 | Beal | July 25, 1922 |
| 1,617,717 | Lombard | Feb. 15, 1927 |
| 1,646,552 | Mosel | Oct. 25, 1927 |
| 1,656,397 | Shields | Jan. 17, 1928 |
| 1,815,839 | Ferguson | July 21, 1931 |
| 2,386,541 | Campodonico | Oct. 9, 1945 |
| 2,843,213 | Schwartz | July 15, 1958 |
| 2,848,086 | Warsaw | Aug. 19, 1958 |
| 2,912,084 | Meyercordt | Nov. 10, 1959 |